(12) United States Patent
Cai

(10) Patent No.: US 8,189,752 B2
(45) Date of Patent: May 29, 2012

(54) PER-SESSION DYNAMIC CHARGING CAPS IN COMMUNICATION NETWORKS

(75) Inventor: Yigang Cai, Naperville, IL (US)

(73) Assignee: Alcatel Lucent, Paris (FR)

( * ) Notice: Subject to any disclaimer, the term of this patent is extended or adjusted under 35 U.S.C. 154(b) by 1293 days.

(21) Appl. No.: 11/850,537

(22) Filed: Sep. 5, 2007

(65) Prior Publication Data

US 2009/0060154 A1    Mar. 5, 2009

(51) Int. Cl.
*H04M 15/06* (2006.01)
*H04M 11/00* (2006.01)
*G06Q 30/00* (2012.01)

(52) U.S. Cl. ............... 379/127.05; 348/296; 370/230.1; 379/114.01; 379/114.03; 379/114.2; 379/130; 379/201.01; 455/405; 455/408; 455/410; 455/433; 705/32; 705/40; 705/53

(58) Field of Classification Search ............ 379/114.01, 379/114.03, 114.2, 127.05, 130, 201.01; 455/405, 406, 408, 410, 433, 411; 705/53, 705/40, 32; 348/296; 370/230.1
See application file for complete search history.

(56) References Cited

U.S. PATENT DOCUMENTS

| | | | | |
|---|---|---|---|---|
| 5,557,664 A * | 9/1996 | Burns et al. | ............ | 379/127.05 |
| 5,579,379 A * | 11/1996 | D'Amico et al. | ........ | 379/114.01 |
| 5,778,313 A * | 7/1998 | Fougnies | ...................... | 455/406 |
| 5,845,267 A * | 12/1998 | Ronen | ........................... | 705/40 |
| 6,029,062 A * | 2/2000 | Hanson | ......................... | 455/408 |
| 6,047,051 A * | 4/2000 | Ginzboorg et al. | ........... | 379/130 |
| 6,169,891 B1 * | 1/2001 | Gorham et al. | ............... | 455/408 |
| 6,546,238 B1 * | 4/2003 | Nightingale et al. | ........ | 455/406 |
| 6,556,818 B1 * | 4/2003 | Meehan | ........................ | 455/406 |
| 6,690,929 B1 * | 2/2004 | Yeh | ................................ | 455/406 |
| 6,871,062 B2 * | 3/2005 | Trop et al. | .................... | 455/406 |
| 7,043,228 B2 * | 5/2006 | Uppal et al. | .................. | 455/406 |
| 7,340,436 B1 * | 3/2008 | Lilge | ................................ | 705/53 |
| 7,649,840 B2 * | 1/2010 | Kalland et al. | ............ | 370/230.1 |
| 8,010,080 B1 * | 8/2011 | Thenthiruperai et al. | ..... | 455/406 |
| 2003/0144951 A1 * | 7/2003 | Leven | ............................. | 705/40 |
| 2005/0009505 A1 * | 1/2005 | Triebel | .......................... | 455/411 |
| 2006/0116105 A1 * | 6/2006 | Frankel et al. | ............... | 455/406 |
| 2007/0242816 A1 * | 10/2007 | Cai et al. | ................... | 379/127.05 |
| 2007/0280455 A1 * | 12/2007 | Cai | .......................... | 379/201.01 |
| 2008/0106625 A1 * | 5/2008 | Border et al. | ................. | 348/296 |
| 2009/0034702 A1 * | 2/2009 | Cai | ............................ | 379/114.2 |
| 2009/0060154 A1 * | 3/2009 | Cai | .......................... | 379/127.05 |
| 2009/0063315 A1 * | 3/2009 | Cai | ................................ | 705/32 |

* cited by examiner

*Primary Examiner* — Gerald Gauthier
(74) *Attorney, Agent, or Firm* — Duft Bornsen & Fishman LLP

(57) ABSTRACT

Communication networks and associated methods and systems are disclosed that provide per-session dynamic charging caps. For a session, the communication network includes a network element adapted to serve the session, a charging system, and a subscriber server adapted to store charging criteria defined for a party to the session. In operation, the charging system receives one or more charging request messages from the network element. Responsive to a charging request message, the charging system identifies the charging criteria defined for the party as stored in the subscriber server, and determines a dynamic charging cap for the session based on the charging criteria. A charging cap is a limited or maximum amount of time and/or money that is charged for an individual session. The charging system then limits the charging for the session based on the dynamic charging cap.

20 Claims, 6 Drawing Sheets

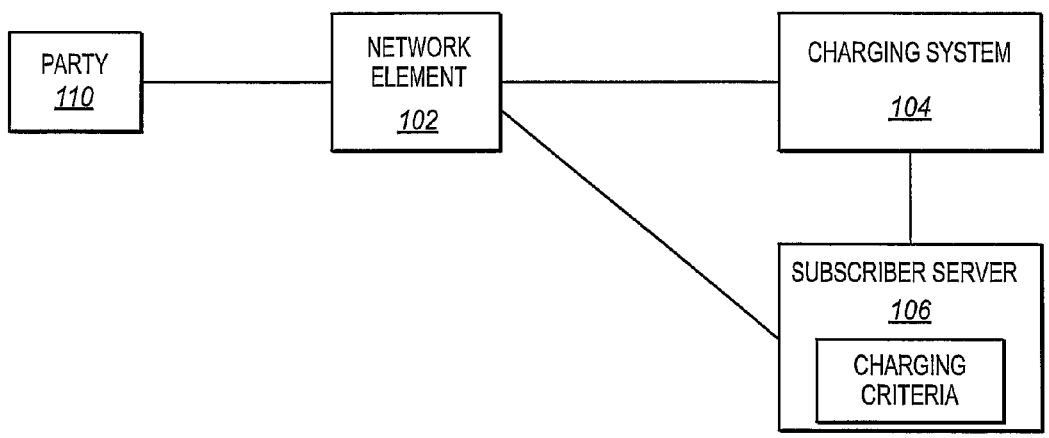
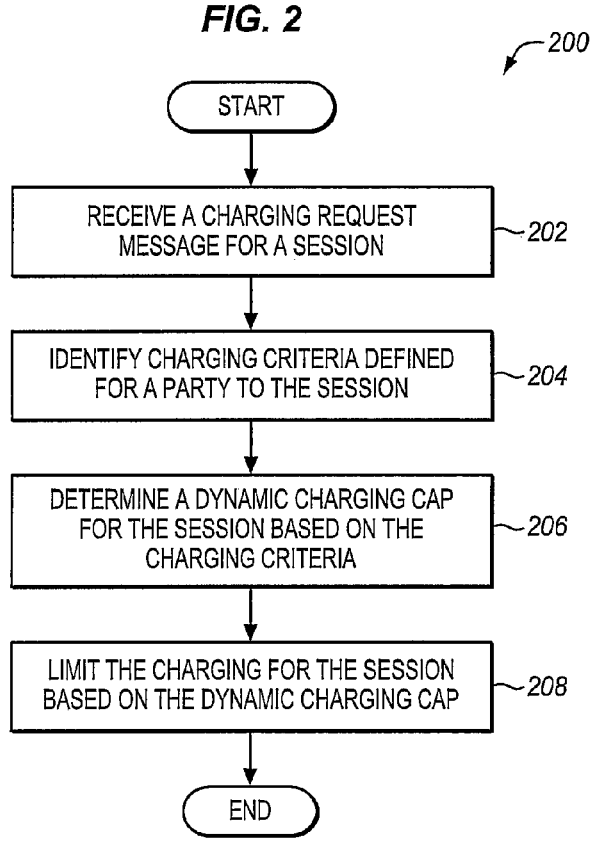

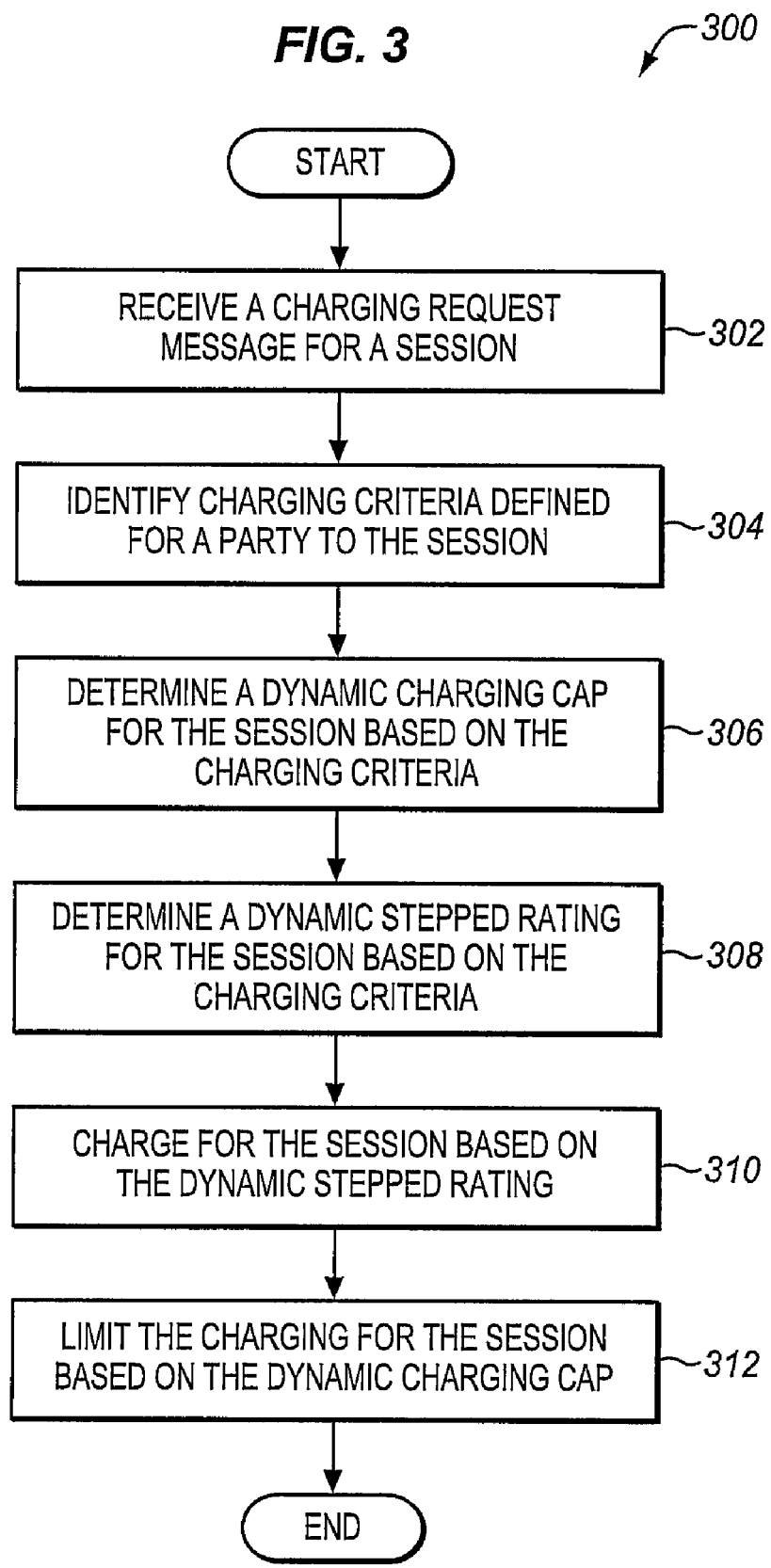

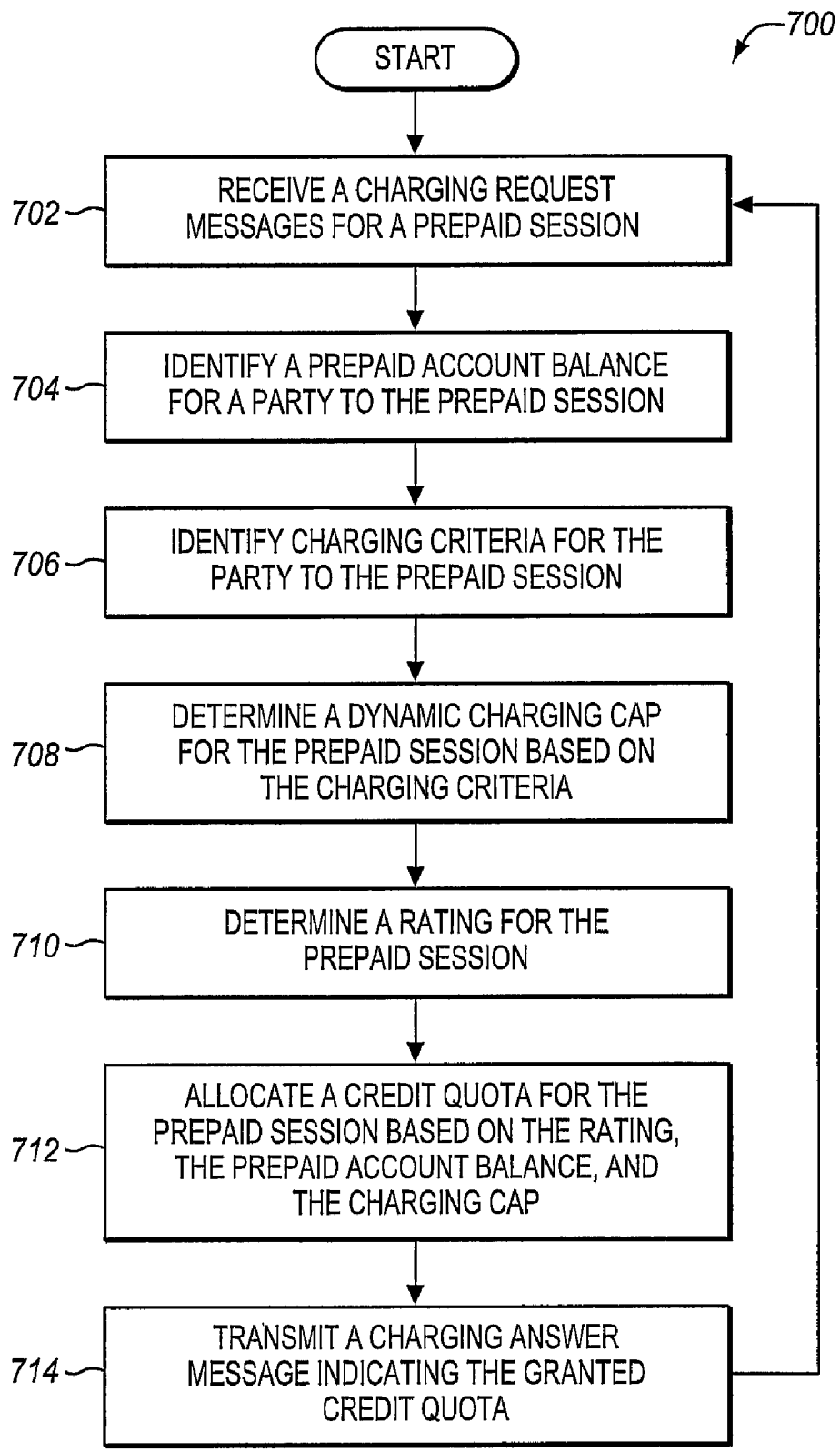

PER-SESSION DYNAMIC CHARGING CAPS IN COMMUNICATION NETWORKS

BACKGROUND OF THE INVENTION

1. Field of the Invention

The invention is related to the field of communications and, in particular, to providing per-session dynamic charging caps for sessions in a communication network. More particularly, a dynamic charging cap is determined for a session (prepaid or postpaid) based on charging criteria that is defined for a party to the session.

2. Statement of the Problem

Communication networks include charging mechanisms in order to bill for calls or sessions placed over the network. The charging mechanisms may be prepaid or postpaid. For a typical postpaid session over a communication network, the switch that is serving the session transmits one or more charging request messages for the session to a postpaid server. The postpaid server processes the charging request messages to generate a Charging Data Record (CDR) for the session. The postpaid server inserts a total duration for the session in the CDR along with other session information. The postpaid server then transmits the CDR to a billing system. The billing system for postpaid sessions typically includes a rating engine that is used to rate the session. The rating may be a flat rating, such as $0.05 per minute. The rating may alternatively be a stepped rating, such as $0.05 per minute for the first five minutes, $0.08 per minute for the next five minutes, and then $0.12 per minute for the remainder of the session. The billing system then calculates a charge (i.e., cost or fee) for the session based on the total duration and the rating.

For a typical prepaid session over a communication network, the switch that is serving the session transmits a charging request message for the session to a prepaid server. The prepaid server identifies a prepaid account balance for the party to the session, and determines a rating for the session (either flat rating or stepped rating). The prepaid server then grants a credit quota based on the prepaid account balance and the rating, and transmits the credit quota to the switch. The switch then performs budget control by decrementing the credit quota as the session progresses. When the credit quota is empty, the switch again transmits a charging request message for the session to the prepaid server requesting a new credit quota. If there is a sufficient balance in the prepaid account of the party, then the prepaid server grants another credit quota and transmits the credit quota to the switch. The switch then performs budget control by decrementing the credit quota as the session progresses. This process continues until either the session ends or the prepaid account for the party becomes empty. The party is thus charged for the prepaid session based on the duration of the session.

One problem with present charging systems is that charging is based on the total duration of a session. Service providers may want more flexibility in how charging is performed for sessions. For instance, a service provider may want to offer a promotion where the first five minutes of a session is charged, while the remainder of the session is free. Unfortunately, present charging systems are not flexible to charge for sessions in this manner.

SUMMARY OF THE SOLUTION

The invention solves the above and other problems by implementing a charging cap for sessions over a communication network. Charging criteria is defined such that a charging system may determine a dynamic charging cap for an individual session over the communication network. Charging for the individual session is then limited to the dynamic charging cap. This advantageously allows service providers to implement new service plans to attract new customers. For example, a new service plan may be that calls to family members have a charging cap of five dollars.

In one embodiment of the invention, a communication network includes a network element adapted to serve a session, a charging system, and a subscriber server adapted to store charging criteria defined for a party to the session. In operation, the charging system receives one or more charging request messages from the network element. Responsive to a charging request message, the charging system identifies the charging criteria defined for the party as stored in the subscriber server, and determines a dynamic charging cap for the session based on the charging criteria. A charging cap is a limited or maximum amount of time and/or money that is charged for an individual session. The charging system then limits the charging for the session based on the dynamic charging cap.

In another embodiment, the charging system additionally determines a dynamic stepped rating (duration and tariff) for the session based on the charging criteria. The charging system then charges for the session based on the dynamic stepped rating. As in the previous embodiment, the charging system limits the charging for the session based on the dynamic charging cap.

In another embodiment, the charging system includes a postpaid server and a billing system. The postpaid server receives the charging request messages from the network element, and calculates a total duration for the session based on the charging request messages. The postpaid server generates a CDR that includes the total duration for the session, and transmits the CDR to the billing system. The billing system identifies the charging criteria defined for the party as stored in the subscriber server, and determines a dynamic charging cap for the session based on the charging criteria. The billing system accesses a rating engine to determine a rating for the session. The billing system then determines a charge (i.e., cost or fee) for the session based on the rating that was determined for the session and the total duration for the session, and limits the charge based on the dynamic charging cap.

In another embodiment, the charging system includes a prepaid server. The prepaid server receives the charging request message from the network element, and identifies a prepaid account for the party. The prepaid server identifies the charging criteria defined for the party, and determines a dynamic charging cap for the session based on the charging criteria. The prepaid server also determines a rating for the session. The prepaid server then allocates a credit quota (i.e., slice) for the session based on the rating that was determined for the session, the prepaid account balance for the party, and the charging cap. The prepaid server then transmits a charging answer message to the network element indicating the granted credit quota for the prepaid session. The network element may then perform budget control for the session based on the granted credit quota. The prepaid server continues to grant credit quotas to the network element until the charging cap is reached. After that point, there is no charge for the session.

The invention may include other exemplary embodiments described below.

DESCRIPTION OF THE DRAWINGS

The same reference number represents the same element or the same type of element on all drawings.

FIG. 1 illustrates a communication network in an exemplary embodiment of the invention.

FIG. 2 is a flow chart illustrating a method of providing per-session charging caps in an exemplary embodiment of the invention.

FIG. 3 is a flow chart illustrating a method of providing a dynamic stepped rating for sessions in an exemplary embodiment of the invention.

FIG. 7 is a flow chart illustrating a method of performing prepaid charging with a dynamic charging cap in an exemplary embodiment of the invention.

DETAILED DESCRIPTION OF THE INVENTION

Figure 4:
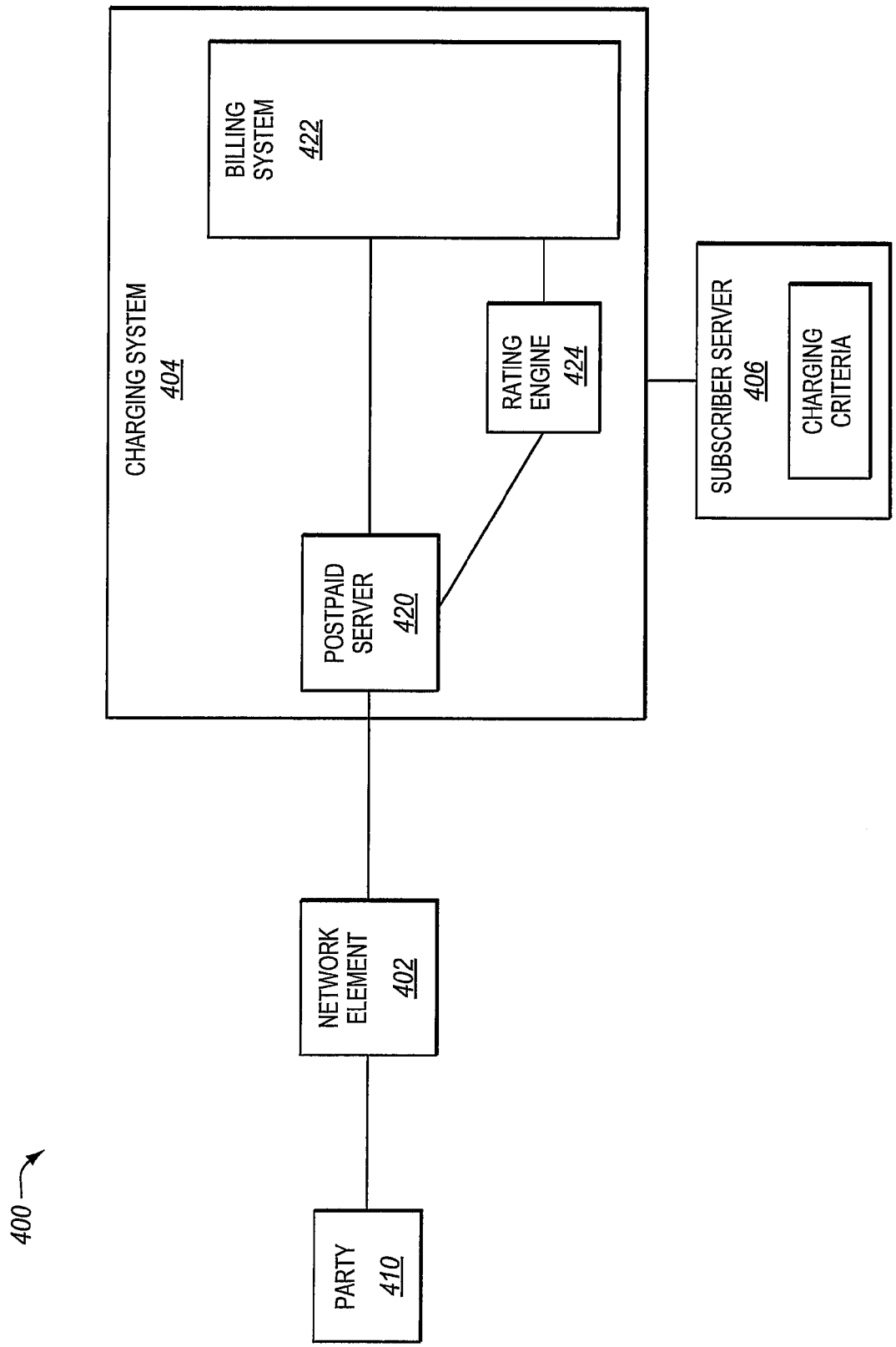
FIG. 4 illustrates another communication network for providing postpaid charging in an exemplary embodiment of the invention.

FIGS. 1-7 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

FIG. 1 illustrates a communication network 100 in an exemplary embodiment of the invention. Communication network 100 may comprise an IMS network, a PSTN, a CDMA network, a GSM network, or another type of communication network. Communication network 100 includes a network element (NE) 102, a charging system 104, and a subscriber server 106. Network element 102 comprises any system, server, or application adapted to serve a session (alternatively referred to as a call) for a party 110 over communication network 100. Examples of network element 102 include an MSC in a cellular network, a switch in a PSTN, and a Call Session Control Function (CSCF) in an IMS network.

Charging system 104 comprises any system, server, or application adapted to provide charging for a session. Charging system 104 may comprise a prepaid charging system or a postpaid charging system. If providing prepaid charging, then charging system 104 maintains a prepaid account for party 110 and is adapted to provide online charging for sessions in which party 110 is a participant. If providing postpaid charging, then charging system 104 maintains a postpaid account for party 110 and is adapted to provide offline charging for sessions in which party 110 is a participant.

Subscriber server 106 comprises any database, server, or application adapted to store and maintain subscriber information or subscriber data for one or more subscribers, such as party 110. For instance, subscriber server 106 may maintain subscriber data in the form of a subscriber record or subscriber profile. Subscriber server 106 may comprise a single centralized system or may be distributed among multiple systems. If implemented in multiple systems, then the systems communicate to maintain common subscriber data. Subscriber server 104 may comprise a Home Location Register (HLR), such as a Super-Distributed HLR (S-DHLR) from Lucent Technologies. Subscriber server 106 may alternatively comprise a Home Subscriber Server (HSS) or a combined HLR/HSS.

In this embodiment, subscriber server 106 is further adapted to store charging criteria. Charging criteria comprises any policies or rules defined to determine a dynamic charging cap for an individual session based on some input data. The input data may be session based, such as a directory number for the other party to the session, a media type of the session (e.g., voice, data, multimedia), a time/day of the session, etc. The data may be subscriber based, such as a service plan of the subscriber (e.g., level of service, promotions, etc), a home/roaming status of the subscriber, etc. Charging criteria may also comprise any policies or rules defined to determine a dynamic stepped rating for an individual session based on some data.

Assume that party 110 initiates a session or is involved in a session, and network element 102 is serving the session. In order to provide charging, network element 102 generates a charging request message and transmits the charging request message to charging system 104. The charging request message may comprise a Diameter message in an IMS network, a CAMEL message in a GSM network, an ANSI message in a CDMA network, an INAP message in another type of network, etc.

FIG. 2 is a flow chart illustrating a method 200 of providing a dynamic charging cap for sessions in an exemplary embodiment of the invention. The steps of method 200 will be described with reference to communication network 100 in FIG. 1. The steps of the flow chart in FIG. 2 are not all inclusive and may include other steps not shown. The steps of method 200 are described as being performed by charging system 104, but one or more of the steps of method 200 may be performed by another node or nodes in communication network 100, such as subscriber server 106.

In step 202, charging system 104 receives the charging request message from network element 102. In step 204, charging system 104 identifies the charging criteria defined for party 110 as stored in subscriber server 106. For instance, charging system 104 may query subscriber server 106 to obtain the charging criteria. Those skilled in the art will appreciate that charging system 104 may store the charging criteria instead of or in addition to subscriber server 106. In step 206, charging system 104 determines a dynamic charging cap for the session based on the charging criteria. A charging cap is a limited or maximum amount of time and/or money that is charged for an individual session. The charging cap is dynamic in this embodiment because the charging cap is determined for each individual session based on the charging criteria, and is not fixed or static.

In step 208, charging system 104 limits the charging for the session based on the dynamic charging cap. As a result, the amount that party 110 is charged for the session is limited to the charging cap. If the total duration of the session extends beyond the charging cap, then party 110 will not be charged for the total duration but will only be charged up to the charging cap.

Network element 102 may also determine that the dynamic charging cap is reached during the session. If network element 102 determines that the dynamic charging cap is reached or is substantially reached, then network element 102 notifies party 110 when the dynamic charging cap is reached. Network element 102 may further determine what media type is used to notify party 110, such as voice, text message, multimedia message, etc.

Charging system 104 executes service logic based on the charging criteria and some input data to determine the dynamic charging cap. For one example, charging system 104 may process the charging criteria and a directory number of another party (not shown) to the session to determine the charging cap. For instance, party 110 may subscribe a service where calls to a family member have a charging cap of $1. Thus, if charging system 104 determines that party 110 has placed a call to a family member, then charging system 104 will determine a charging cap of $1 is to be applied to this session.

In another example, charging system 104 may process the charging criteria and a session type to determine the charging cap. A session type may include a local session, a toll session, an international session, etc. For instance, if party 110 places an international call, then charging system 104 may determine that the charging cap is $10. If party 110 places a national toll call, then charging system 104 may determine that the charging cap is $5.

In another example, charging system 104 may process the charging criteria and a media type for the session to determine the dynamic charging cap. A media type may include a voice session (e.g., a voice call), a data session (e.g., email, Internet, gaming), a text session, a multimedia session, etc. For instance, if party 110 initiates a voice session, then charging system 104 may determine that the charging cap is $5. If party 110 initiates a gaming session, then charging system 104 may determine that the charging cap is $20.

In another example, charging system 104 may process the charging criteria and a time/day of the session to determine the dynamic charging cap. For instance, if party 110 initiates a call during business hours, then charging system 104 may determine that the charging cap is $5. If party 110 initiates a call in the evening or night, then charging system 104 may determine that the charging cap is $3.

In another example, charging system 104 may process the charging criteria and a service plan of the subscriber to determine the dynamic charging cap. The service plan may indicate a particular level of service subscribed to by party 110, such as a gold level of service, a silver level of service, etc. The charging cap may thus depend on the level of service subscribed to by party 110. The service plan may alternatively indicate a promotion offered by the service provider giving party 110 a particular charging cap for a length of time, such as one month, three months, etc.

In another example, charging system 104 may process the charging criteria and a home/roaming status of party 110 to determine the dynamic charging cap. For instance, if party 110 is a mobile user and initiates a call from a home location, then charging system 104 may determine that the charging cap is $5. If party 110 initiates a call from a roaming location, then charging system 104 may determine that the charging cap is $10.

Any of the above charging criteria and/or other charging criteria not specifically described herein may be used to determine a charging cap for a session. Because the charging criteria may be defined for many different characteristics of a session and/or party 110, there may be conflicts among the different charging criterion. When a conflict arises, there may be priorities assigned to the charging criterion to determine which charging cap should be assigned to the session. For example, if one charging criterion defines that the charging cap for a data session is $5 and another charging criterion further defines that the charging cap for a session is $10, then there may be a priority assigned to one or both of the charging criterion to determine which one controls. The service logic in charging system 104 that is processing the charging criteria may alternatively resolve any conflicts, such as by choosing the lowest or highest charging cap determined from the charging criteria.

In addition to determining the charging cap in a dynamic manner based on the charging criteria, charging system 104 may additionally determine a dynamic stepped rating based on the charging criteria. FIG. 3 is a flow chart illustrating a method 300 of providing a dynamic stepped rating for sessions in an exemplary embodiment of the invention. The steps of method 300 will be described with reference to communication network 100 in FIG. 1. The steps of the flow chart in FIG. 3 are not all inclusive and may include other steps not shown. The steps of method 300 are described as being performed by charging system 104, but one or more of the steps of method 300 may be performed by another node or nodes in communication network 100, such as subscriber server 106.

For method 300, steps 302, 304, and 306 are similar to method 200 in receiving a charging request message for a session, identifying charging criteria for the session, and determining a dynamic charging cap for the session. In addition to these steps, method 300 further includes step 308 where charging system 104 determines a dynamic stepped rating (duration and tariff) for the session based on the charging criteria. The same or different charging criteria may be used to determine the charging cap and the stepped rating. The dynamic stepped rating may be determined with the goal of discouraging longer duration sessions, such as by increasing the tariff over time. The dynamic stepped rating may alternatively be determined with the goal of encouraging longer duration sessions, such as by decreasing the tariff over time.

In step 310, charging system 104 charges for the session based on the dynamic stepped rating. In step 312, charging system 104 limits the charging for the session based on the dynamic charging cap. As a result, the amount that party 110 is charged for the session is limited to the charging cap. If the total duration of the session extends beyond the charging cap, then party 110 will not be charged for the total duration but will only be charged up to the charging cap.

In one embodiment, the charging cap may be built in to the dynamic stepped rating. As an example, the last step in the dynamic stepped rating may have a tariff of zero for an infinite duration. Thus, if charging system 104 charges for the session based on the stepped rating, the charging for the session will be automatically capped when the tariff of the stepped rating reaches zero.

FIG. 4 illustrates another communication network 400 for providing postpaid charging in an exemplary embodiment of the invention. Communication network 400 may comprise an IMS network, a PSTN, a CDMA network, a GSM network, or another type of communication network. Communication network 400 includes a network element (NE) 402, a charging system 404, and a subscriber server 406, much like as illustrated in FIG. 1. In communication network 400, charging system 404 includes a postpaid server 420, a billing system 422, and a rating engine 424. Those skilled in the art will appreciate that rating engine 424 may be included in billing system 422 or postpaid server 420. Postpaid server 420 is adapted to provide postpaid charging functions. Billing system 422 is adapted to resolve charging for sessions to generate a bill. Rating engine 424 is adapted to generate a rating for a session. For instance, rating engine 424 may determine that a rating for a call is $0.05/minute, $0.10/minute, etc.

Assume that party 410 initiates a session or is involved in a session, and network element 402 is serving the session. In order to provide charging, network element 402 generates charging request messages and transmits the charging request messages to postpaid server 420. The charging request messages may include a start message indicating the beginning of charging for the session, one or more interim messages during the session, and a stop message indicating the end of charging for the session.

Figure 5:
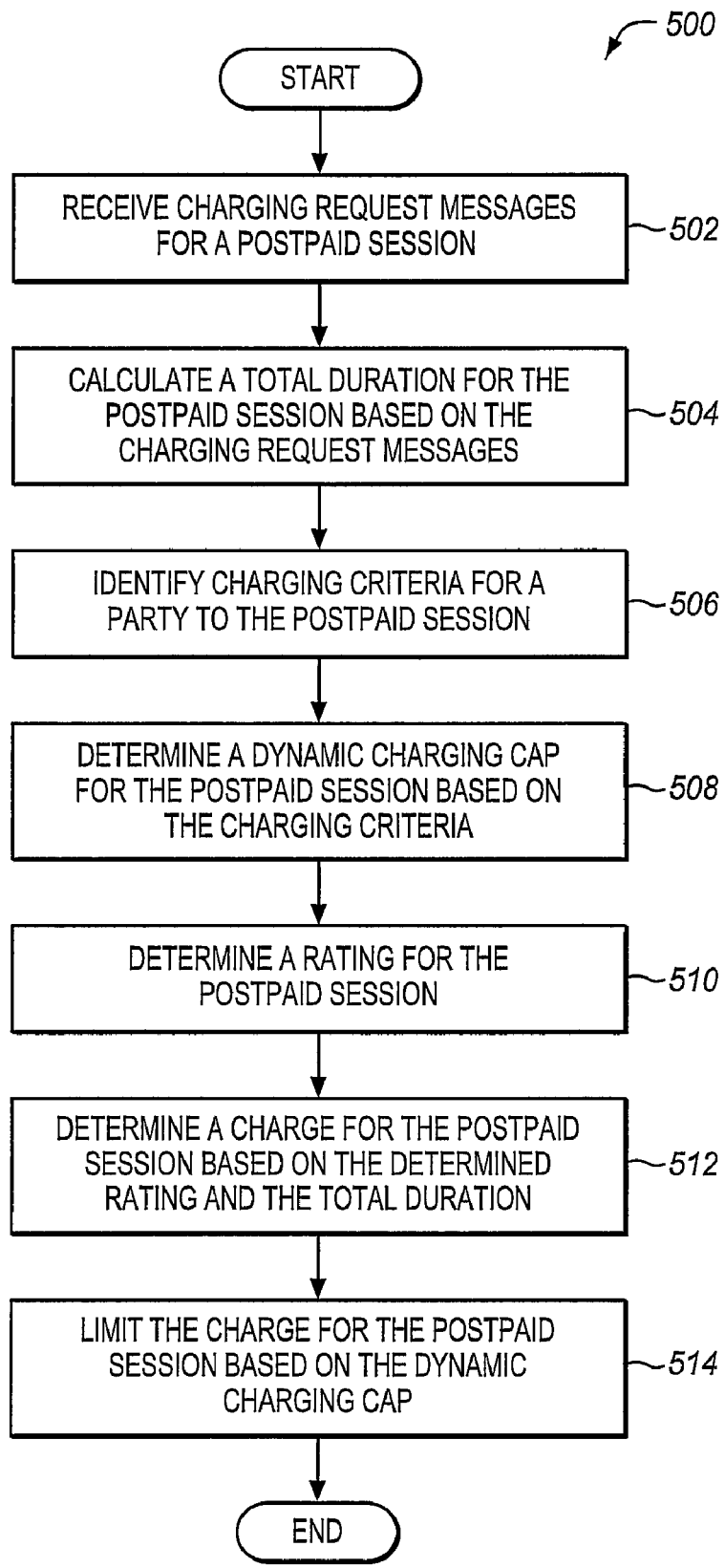
FIG. 5 is a flow chart illustrating a method of performing postpaid charging with a dynamic charging cap in an exemplary embodiment of the invention.

FIG. 5 is a flow chart illustrating a method 500 of performing postpaid charging with a dynamic charging cap in an exemplary embodiment of the invention. The steps of method 500 will be described with reference to communication network 400 in FIG. 4. The steps of the flow chart in FIG. 5 are not all inclusive and may include other steps not shown.

In step 502, postpaid server 420 receives the charging request messages from network element 402. The charging request messages may be of a variety of protocols based on the type of network for communication network 400. For instance, if communication network 400 comprises an IMS network, then the charging request messages may comprise Diameter Accounting Request (ACR) messages. In step 504, postpaid server 420 calculates a total duration for the session based on the charging request messages, such as through a start timestamp and a stop timestamp included in a start charging request message and a stop charging request message, respectively. Postpaid server 420 then generates a CDR that includes the total duration for the session, and transmits the CDR to billing system 422.

Responsive to receiving the CDR, billing system 422 identifies the charging criteria defined for party 410 as stored in subscriber server 406 in step 506. Billing system 422 then determines a dynamic charging cap for the session based on the charging criteria in step 508. Billing system 422 may process the charging criteria and other input data as described above in prior embodiments to determine the charging cap for this session. In step 512, billing system 422 accesses rating engine 424 to determine a rating for the session. In determining the rating for the session, billing system 422 may also process the charging criteria to determine a dynamic stepped rating for the session. In step 514, billing system 422 determines a charge (i.e., cost or fee) for the session based on the rating that was determined for the session and the total duration for the session. In step 516, billing system 422 limits the charge for the session based on the dynamic charging cap. As a result, the amount that party 410 is charged for the session is limited to the charging cap. If the total duration of the session extends beyond the charging cap, then party 410 will not be charged for the total duration but will only be charged up to the charging cap.

In an alternative embodiment, postpaid server 420 may access rating engine 424 to determine a rating for the session. Postpaid server 420 may then generate a rated CDR for the session, and transmit the rated CDR to billing system 422. In another alternative, postpaid server 420 may determine the charging cap, and generate a CDR that includes the charging cap for the session.

Figure 6:
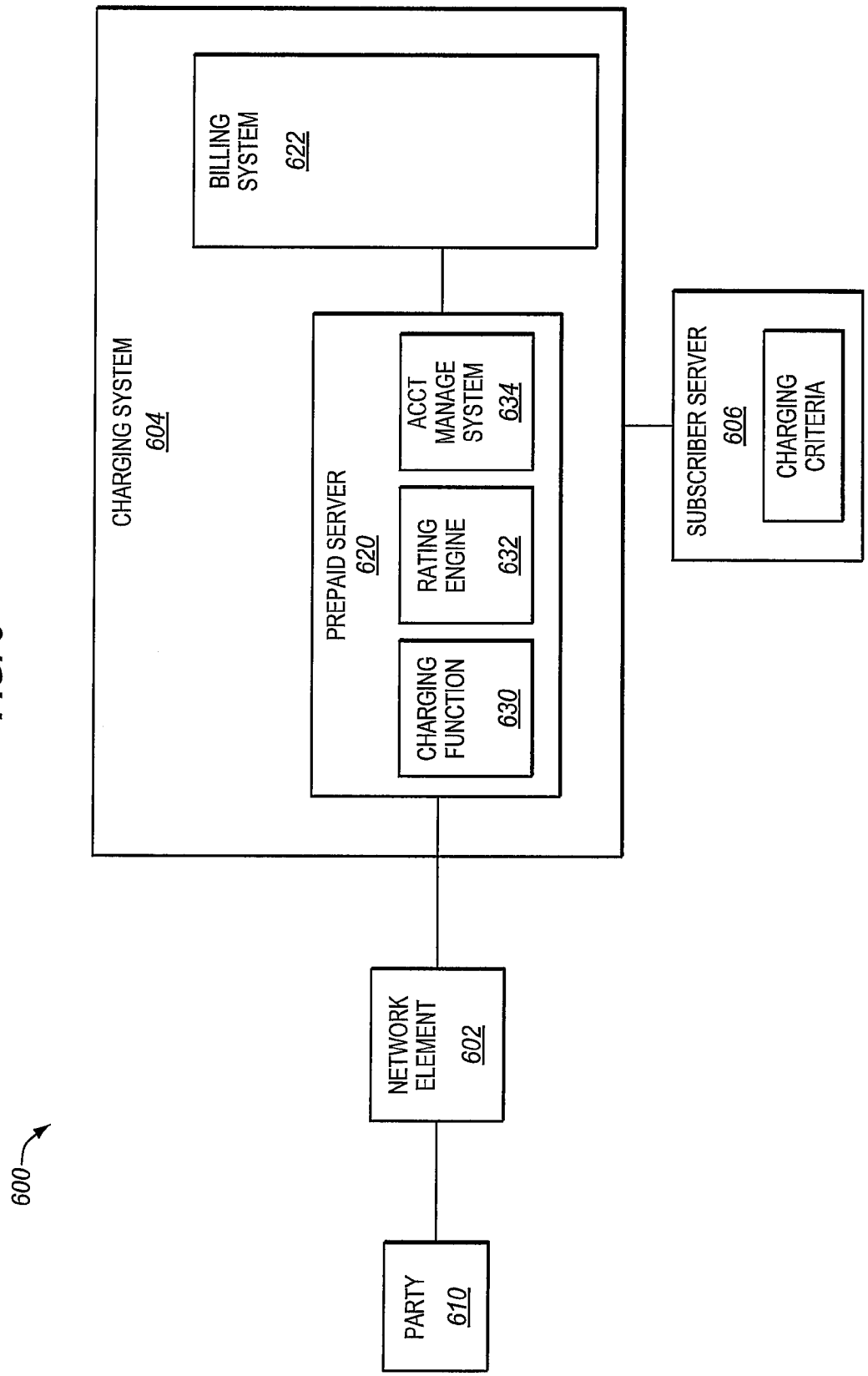
FIG. 6 illustrates another communication network for providing prepaid charging in an exemplary embodiment of the invention.

FIG. 6 illustrates another communication network 600 for providing prepaid charging in an exemplary embodiment of the invention. Communication network 600 includes a network element (NE) 602, a charging system 604, and a subscriber server 606, much like as illustrated in FIG. 1. In communication network 600, charging system 604 includes a prepaid server 620 and a billing system 622. Prepaid server 620 includes a charging function 630, a rating engine 632, and an account management system 634. Charging function 630 is adapted to provide prepaid charging functions. Rating engine 632 is adapted to generate a rating for a session. Account management system 634 is adapted to maintain prepaid accounts for subscribers. For instance, account management system 634 maintains a prepaid account for party 610, such as by monitoring a balance in the prepaid account (e.g., $20).

Assume that party 610 initiates a session or is involved in a session, and network element 602 is serving the session. In order to provide charging, network element 602 generates a charging request message and transmits the charging request message to prepaid server 620. The charging request message may comprise a start message indicating the beginning of charging for the session, one or more interim messages during the session, or a stop message indicating the end of charging for the session.

FIG. 7 is a flow chart illustrating a method 700 of performing prepaid charging with a dynamic charging cap in an exemplary embodiment of the invention. The steps of method 700 will be described with reference to communication network 600 in FIG. 6. The steps of the flow chart in FIG. 7 are not all inclusive and may include other steps not shown.

In step 702, charging function 630 in prepaid server 620 receives the charging request message from network element 602. The charging request message may be of a variety of protocols based on the type of network for communication network 600. For instance, if communication network 600 comprises an IMS network, then the charging request message may comprise Diameter Credit Control Request (CCR) message. In step 704, charging function 630 accesses account management system 634 to identify a prepaid account for party 610. In step 706, charging function 630 identifies the charging criteria defined for party 410 as stored in subscriber server 606. In step 708, charging function 630 determines a dynamic charging cap for the session based on the charging criteria. Charging function 630 may process the charging criteria and other input data as described above in prior embodiments to determine the charging cap for this session.

In step 710, charging function 630 accesses rating engine 632 to determine a rating for the session. In determining the rating for the session, charging function 630 may also process the charging criteria to determine a dynamic stepped rating for the session. In step 712, charging function 630 allocates a credit quota (i.e., slice) for the session based on the rating that was determined for the session, based on the prepaid account balance for party 610, and based on the charging cap. In step 714, charging function 630 transmits a charging answer message to network element 602 indicating the granted credit quota for the prepaid session.

Network element 602 then performs budget control for the session based on the granted credit quota. If the granted credit quota empties during budget control, then network element 602 transmits another charging request message to prepaid server 620. Charging function 630 then allocates another credit quota for the session based on the rating that was determined for the session, based on the prepaid account balance for party 610, and based on the charging cap. Charging function 630 transmits a charging answer message to network element 602 indicating the granted credit quota for the prepaid session.

This process continues until the charging cap is reached or the session ends. If the charging cap is reached, then charging function 630 grants a credit quota that indicates no further charging. Network element 610 may thus suspend budget control or perform budget control with a no-charge quota. After the session ends, charging function 630 generates a CDR for the session, and transmits the CDR to billing system 622. Billing system 622 may then bill for the session based on information in the CDR.

Although specific embodiments were described herein, the scope of the invention is not limited to those specific embodiments. The scope of the invention is defined by the following claims and any equivalents thereof.

I claim:

1. An apparatus comprising:
a charging system adapted to receive at least one charging request message from a network element that is serving a session involving a party, to identify charging criteria defined for the party, to determine a per-session dynamic charging cap for the session based on the charging criteria and data for the session, and to limit charging for the session based on the dynamic charging cap.

2. The apparatus of claim 1 wherein the charging system is further adapted to:
determine a dynamic stepped rating for the session based on the charging criteria defined for the party; and
charge for the session based on the dynamic stepped rating as limited by the dynamic charging cap.

3. The apparatus of claim 1 further comprising the network element adapted to:
determine that the dynamic charging cap is reached during the session; and
notify the party when the dynamic charging cap is reached.

4. The apparatus of claim 1 wherein the charging system is further adapted to determine the dynamic charging cap for the session based on the charging criteria and information on another party to the session.

5. The apparatus of claim 1 wherein the charging system is further adapted to determine the dynamic charging cap for the session based on the charging criteria and the media type for the session.

6. The apparatus of claim 1 wherein the charging system is further adapted to determine the dynamic charging cap for the session based on the charging criteria and the time of day or day of the week for the session.

7. The apparatus of claim 1 wherein the charging system is further adapted to determine the dynamic charging cap for the session based on the charging criteria and a service plan subscribed to by the party.

8. A method comprising:
receiving at least one charging request message from a network element that is serving a session involving a party;
identifying charging criteria defined for the party;
determining a per-session dynamic charging cap for the session based on the charging criteria and data for the session; and
limiting charging for the session based on the dynamic charging cap.

9. The method of claim 8 further comprising:
determining a dynamic stepped rating for the session based on the charging criteria defined for the party; and
charging for the session based on the dynamic stepped rating as limited by the dynamic charging cap.

10. The method of claim 8 further comprising:
determining that the dynamic charging cap is reached during the session; and
notifying the party when the dynamic charging cap is reached.

11. The method of claim 8 wherein determining a dynamic charging cap for the session based on the charging criteria comprises:
determining the dynamic charging cap for the session based on the charging criteria and information on another party to the session.

12. The method of claim 8 wherein determining a dynamic charging cap for the session based on the charging criteria comprises:
determining the dynamic charging cap for the session based on the charging criteria and the media type for the session.

13. The method of claim 8 wherein determining a dynamic charging cap for the session based on the charging criteria comprises:
determining the dynamic charging cap for the session based on the charging criteria and the time of day or day of the week for the session.

14. The method of claim 8 wherein determining a dynamic charging cap for the session based on the charging criteria comprises:
determining the dynamic charging cap for the session based on the charging criteria and a service plan subscribed to by the party.

15. A method comprising:
receiving charging request messages from a network element that is serving a postpaid session involving a party;
calculating a total duration for the postpaid session based on the charging request messages;
identifying charging criteria defined for the party;
determining a per-session dynamic charging cap for the postpaid session based on the charging criteria and data for the postpaid session;
determining a rating for the postpaid session;
determining a charge for the postpaid session based on the rating and the total duration for the postpaid session; and
limiting the charge for the postpaid session based on the dynamic charging cap.

16. The method of claim 15 further comprising:
determining a dynamic stepped rating for the postpaid session based on the charging criteria defined for the party; and
determining the charge for the postpaid session based on the dynamic stepped rating and the total duration for the postpaid session.

17. The method of claim 15 further comprising:
determining that the dynamic charging cap is reached during the postpaid session; and
notifying the party when the dynamic charging cap is reached.

18. A method comprising:
receiving a charging request message from a network element that is serving a prepaid session involving a party;
identifying a prepaid account for the party;
identifying charging criteria defined for the party;
determining a per-session dynamic charging cap for the prepaid session based on the charging criteria and data for the prepaid session;
determining a rating for the prepaid session;
allocating a credit quota for the prepaid session based on the rating, the prepaid account balance for the party, and the charging cap; and
transmitting a charging answer message to the network element indicating the granted credit quota for the prepaid session.

19. The method of claim 18 further comprising:
receiving another charging request message from the network element;
allocating another credit quota for the prepaid session based on the rating, the prepaid account balance for the party, and the charging cap; and
transmitting another charging answer message to the network element indicating the granted credit quota for the prepaid session.

20. The method of claim 18 further comprising:
determining a dynamic stepped rating for the prepaid session based on the charging criteria defined for the party.

* * * * *